United States Patent

[11] 3,590,165

[72] Inventors Robert B. Curtis;
Frederick H. Parkinson, Jr., both of Columbus, Ohio

[21] Appl. No. 693,873
[22] Filed Dec. 27, 1967
[45] Patented June 29, 1971
[73] Assignee Bell Telephone Laboratories, Incorporated Murray Hill, Berkeley Heights, N.Y.

[54] SWITCHING SYSTEM HAVING JUNCTOR CIRCUITS FOR HOLDING ESTABLISHED NETWORK CONNECTIONS
20 Claims, 5 Drawing Figs.

[52] U.S. Cl. .......... 179/18
[51] Int. Cl. .......... H04q 3/495
[50] Field of Search .......... 179/18.211, 22

[56] References Cited

UNITED STATES PATENTS 3,487,170 12/1969 Pearce et al. .......... 179/18 (SP)

*Primary Examiner*—Kathleen H. Claffey
*Assistant Examiner*—Thomas W. Brown
*Attorneys*—R. J. Guenther and James Warren Falk

ABSTRACT: A switching system is disclosed in which junctor circuits intermediate two stages of a switching network provide the sleeve lead holding ground for established network connections. The use of the junctor circuits to maintain an established connection, rather than one of the end circuits connected to the network, permits a plurality of network paths to be in existence concurrently to a circuit having a single network appearance. Each path may be released independently of the other since the sleeve leads of the concurrent paths remain independent of each other.

INVENTORS: R. B. CURTIS
F. H. PARKINSON, JR.
BY Donald M Duft
ATTORNEY

SWITCHING SYSTEM HAVING JUNCTOR CIRCUITS FOR HOLDING ESTABLISHED NETWORK CONNECTIONS

Background of the Invention

This invention relates to a switching system and, in particular, to a system in which a plurality of separate paths may be concurrently established, during the serving of a call, by a switching network to a circuit having a single appearance on the network. This invention further relates to a switching system of the electromechanical type in which each established network connection is held under control of a circuit common to the entire system, rather than under control of a circuit connected to one end of the network and involved in the connection.

With the exception of some step-by-step systems, the connections that must be established within an office in order to extend a call from an incoming trunk circuit to an outgoing trunk circuit extending to the next office amount to considerably more than the mere interconnection of the incoming and outgoing trunk circuits. Other intraoffice connections are also required in order to (1) receive the call information that is outpulsed from the preceding office; (2) translate the received call information to determine the office to which the call is to be routed in connection with its forward establishment; (3) select an idle trunk circuit extending to the forward office, and (4) outpulse via the selected outgoing trunk circuit the information required by the next office for serving the call. Additional intraoffice connections are required if the office is equipped to serve customer dialed toll calls, including those of the person-to-person, collect, and other similar types which require the temporary assistance of an operator for their completion.

As an example of the many intraoffice connections that may be required in a typical office, U.S. Pat. No. 3,341,661 to R. B. Curtis of Sept. 12, 1967 discloses a crossbar tandem switching system equipped to serve many different types of calls including customer dialed toll calls of the station-to-station type, as well as calls of the person-to-person type that require the temporary operator assistance for their completion. The Curtis system contains a first switching network, comprising a trunk link and an office link, which functions during the serving of a call to connect the incoming calling trunk circuit with the outgoing trunk circuit that is ultimately selected to extend the call to the next office. The Curtis system further includes a second network, a sender link, which functions to interconnect an incoming calling trunk circuit with a sender in order that it may perform many services required on the call. Among the services performed by the sender are, the reception of the call information from the preceding office, and the outpulsing of the call information to the next office via the first switching network and the selected outgoing trunk circuit. The Curtis system further includes a third switching network, a position link, which functions during the serving of customer dialed person-to-person type calls to interconnect a calling trunk circuit with an operator position for the time required for an operator to furnish the assistance required by the calling party. The Curtis system contains another network, a register link, which functions during the serving of certain calls (primarily those from step-by-step offices) to interconnect a calling trunk circuit with an idle register which counts and registers the digits received from the preceding office in dial pulse form.

The Curtis system requires, as do most common control type systems, that the incoming calling trunk circuit, at certain stages of the call, be concurrently connected to a plurality of different circuits within the office. For example, following the interconnection of the incoming and outgoing trunk circuits via the first switching network, the incoming trunk circuit must remain connected to the sender via the sender link so that the information required by the next office may be outpulsed to it. Concurrently therewith, the incoming trunk circuit must also remain connected to an operator position on person-to-person type calls until the calling party receives the service he requires.

The requirement that a calling incoming trunk be concurrently connected to a plurality of circuits within its office necessitates that the office be equipped with a plurality of separate switching networks, each of which functions to provide one of the concurrent connections required. Switching networks, together with their control circuitry, comprise a major portion of the size and cost of any switching center, and it is therefore generally desirable to minimize the number of networks that are provided in any office. Obviously, the ideal situation would be for an office to be equipped with only a single network which would establish all intraoffice connections required. This ideal situation has not been achieved heretofore in any office in which a plurality of concurrent network connections are required to a single circuit, such as for example, an incoming trunk circuit. The reason for this is that the circuitry that has been used heretofore to maintain an established network connection makes it difficult to establish a second concurrent network connection to the same network point. Further, even if a second connection could be established, the holding circuitry used in most systems would make it difficult to release one of the connections while holding the other. In a crossbar switching network for example, a connection is held by maintaining operated the associated hold magnets from a ground on the sleeve lead supplied by one of end circuits on the connection such as for example, an incoming trunk circuit.

In electromechanical switching system in which connections are held by a sleeve lead ground, it is difficult to establish a second network connection to a circuit having a single network appearance since the potential on the sleeve lead is normally used as the determining criteria to indicate whether the circuit is "busy" or "idle." Typically, a battery on the sleeve lead indicates an "idle" circuit; a ground on the sleeve lead indicates a "busy" circuit. Thus, in order to establish a second connection to a circuit having a single network appearance, it would be necessary to provide circuitry which would ignore or override the "busy" ground that would be encountered on the sleeve lead when the second connection is attempted. Even if such a second connection could be established in the manner described, it would still be most difficult to release one of the concurrent connections while maintaining the other. The reason for this is that the sleeve lead holding grounds for the two circuits become directly connected to each other upon the establishment of the second connection. This places the holding circuit for the two connections in parallel with each other so that the hold magnets involved in the maintenance of the second connection are electrically connected to and are in parallel with the hold magnets of the first connection. Since the two sets of hold are electrically paralleled, it is obviously impossible to release the hold magnets for one path independently of the other.

It may therefore be appreciated that it has not heretofore been feasible in electromechanical switching to establish a plurality of connections concurrently to a circuit having a single network appearance because the sleeve lead holding grounds for the two connections would be effectively interconnected and would thereby preclude the release of either connection independently of the other. This characteristic of the prior art electromechanical switching networks has necessitated the provision of a plurality of separate and independent switching networks in systems in which a single circuit, such as for example, an incoming calling trunk circuit must be concurrently connected to a plurality of other circuits. The provision of the additional switching networks has, in turn, increased the cost of the offices in which they are provided.

Brief Summary of the Invention

It is therefore an object of the invention to provide a switching system having improved network-switching facilities.

It is a further object of the invention to provide a switching system in which a minimum number of switching networks are required for the establishment of concurrent connections from a single call serving circuit to other circuits of the office.

In accordance with the disclosed illustrative embodiment of our invention, we provide a system having a switching network in which a plurality of network connections may be established concurrently to a circuit having a single network appearance with each such connection being capable of being released independently of other connections that may be concurrently in existence to the same circuit. The network of our invention is able to establish and release connections in this manner since each established connection is independently maintained by means of a circuit common to the entire system rather than by means of one of the end circuits involved on a connection.

The illustrative disclosed embodiment of our invention comprises an office having an incoming link to which is connected a group of incoming circuits, an outgoing link to which is connected a group of outgoing circuits, a plurality of junctor circuits interconnecting the two links, together with a marker circuit which controls the operation of the two links in establishing network connections between the incoming and outgoing circuits. Both the incoming and outgoing links comprises crossbar matrix-type switches having a plurality of horizontal levels or rows, and a plurality of vertical columns, together with contacts at the intersection of each row and column for interconnecting the conductors of any selected row and column. Each incoming circuit is connected to the conductors of an individual row of the incoming link and each outgoing circuit is connected to the conductors of an individual row of the outgoing link. Each set of conductors comprising a vertical on one link is connected by an individual junctor circuit to the corresponding vertical on the other link. In other words, the conductors comprising the first vertical, i.e., vertical O on the incoming link are connected to a junctor circuit O which, in turn, is connected to the conductors of vertical O of the outgoing link. As is typical in the prior art crossbar switching networks, each switch horizontal is associated with a select magnet and each vertical is associated with a hold magnet. Further, one side of the winding of each hold magnet is connected to the sleeve lead of its vertical. The interconnection of the conductors of a selected horizontal with those of a selected vertical is effected by the momentary operation of the select magnet for the row followed by the operation of the hold magnet for the vertical. The select magnet may release following the operation of the hold magnet and the connection is then held as long as the hold magnet remains operated from a ground on the sleeve lead of its vertical.

The system of our invention differs from the prior art in that the ground that maintains operated the hold magnets associated with an established connection is provided by the junctor circuit interconnecting the two verticals of the connection rather than by the incoming or outgoing circuits involved on the interconnection and connected to the switch horizontals. Each incoming and outgoing circuit, for example, an incoming trunk circuit, is connected to its associated switch horizontal by means of a pair of tip and ring conductors but not by a sleeve conductor. The tip and ring conductors of each horizontal may be connected by cross-point contacts with the tip and ring conductors of any vertical on the same switch. The tip and ring conductors of each switch vertical on the incoming link are connected to an individual junctor circuit which is also connected to the tip and ring conductors of the corresponding vertical of the outgoing link. Each switch vertical includes a sleeve conductor which extends from one side of the winding of its hold magnet to the junctor circuit associated with the switch vertical. Since each junctor circuit is connected to corresponding verticals of the incoming and outgoing link, the hold magnets of its two associated verticals are effectively in parallel by virtue of their sleeve lead connection to their common junctor circuit.

Each junctor circuit contains a first relay which when operated grounds its sleeve lead and, in turn, maintains operated the hold magnet of each switch vertical to which the junctor circuit is connected. Each junctor circuit also contains a second relay which when operated interconnects the tip and ring conductors of the two switch verticals connected to the junctor. Conversely, the tip and ring conductors of the two verticals common to the junctor are disconnected from each other whenever the second relay is released. The relays of each junctor are operated by a circuit common to the entire system. This expedient permits concurrent connections to a single network appearance to be released independently since the time at which a sleeve lead holding ground is applied and removed for any given connection is controlled by the system itself rather than by one of the circuits involved on the connection.

The disclosed illustrative embodiment of our invention comprises a system which is controlled by an electronic processor of the stored program type. In accordance with well-known techniques, a scanner is provided which, by means of individual connections to various circuit points of our system, transmits signals to the processor informing it of the current operational state and condition of all circuits to which it is connected. The system further includes a signal distributor which, in response to commands transmitted to it from the processor, operates and releases relays within the various circuits of the system.

The receipt of a call by an incoming trunk circuit of our system is detected by the scanner in response to a change of potential at a particular point within the trunk circuit to which the scanner is connected. This change of state is communicated by the scanner to the processor which, with the assistance of the information stored in its memory, recognizes the change of state as a newly arrived incoming call and, in response thereto (1) identifies the trunk circuit receiving the call, and (2) determines the system circuit operations that are required for serving the call. The first such operation that would be required in a typical system would be the connection of a digit receiver to the calling trunk circuit in order that the call information outpulsed from the preceding office may be received, stored, decoded, and utilized for (1) determining the service required on the call, and (2) determining the digits that are to be outpulsed in extending the call forward to the next office.

In accordance with the foregoing sequence of operations, the processor selects an idle digit receiver for use on this call. The digit receivers are included among the outgoing circuits since they appear on the outgoing link. Each receiver is connected to an individual one of the horizontals of the outgoing link along with the remainder of the outgoing circuits. Having identified the incoming trunk circuit and the digit receiver that is to be used on the call, the processor transmits information, via the signal distributor, to the marker specifying the select magnets on the incoming and outgoing links that are to be operated at this time. The marker operates the specified select magnets in response to the receipt of this information, and then proceeds on its own, in a manner typical of prior art markers, to select an idle path between the calling trunk circuit and the digit receiver. In accordance with the disclosed system, the marker performs this path selection operation by ascertaining which junctor circuits are currently idle, and by then selecting one of the idle junctors for use on the call. As a final step in this selection operation, the marker applies an operating potential to the sleeve lead of the selected junctor and, in turn, to the winding of the hold magnets of its associated verticals. This potential operates the hold magnets and closes a path between the calling incoming trunk circuit and the selected digit receiver. The marker informs the processor by means of the scanner as soon as the hold magnets are operated. The processor than (1) closes a first relay in the junctor to apply a holding ground to its sleeve lead, and (2) operates a second relay within the junctor to interconnect its two sets of tip and ring conductors to complete a transmission path from the incoming trunk circuit to the digit receiver.

The call information outpulsed from the preceding office is detected by the receiver, passed to the scanner and from it to the processor. As soon as the processor has accumulated sufficient information to determine the office to which the call is to be routed, it initiates the circuit operations required to interconnect the incoming trunk circuit with an outgoing trunk circuit extending to the next office. Although the incoming trunk circuit at this time is currently connected to the digit receiver, the processor may, in accordance with our invention, initiate the circuit operations required to interconnect the incoming trunk circuit with the selected outgoing trunk circuit. It effects this interconnection via the marker in the same manner as that described for the interconnection of the incoming trunk circuit and the digit receiver. Specifically, the processor instructs the marker to operate (1) the select magnet on the incoming link associated with the calling trunk circuit, and (2) the select magnet on the outgoing link associated with the outgoing trunk circuit. Following the operation of these two select magnets, the marker, in the same manner as before, selects an idle junctor interconnecting the incoming and outgoing link and closes the hold magnet unique to the selected junctor circuit on each link. The operation of the hold magnets on the incoming link interconnects the incoming trunk circuit with the selected junctor by closing the cross-points common to the horizontal serving the trunk circuit and the vertical connected to the junctor. In the same manner, the operation of the hold magnet on the outgoing link interconnects the junctor with the selected outgoing trunk circuit.

Immediately upon being informed by the marker that the hold magnets for the path extending to the outgoing trunk circuit have been closed, the processor operates a relay within the junctor circuit of this path to apply a holding ground to its sleeve lead to maintain the hold magnets for the path operated. For the time being, the second relay in the junctor circuit is not operated in order to maintain isolation between the tip and ring conductors incoming to the junctor from the verticals of each link. Thus the tip and ring conductors of the incoming and outgoing trunk circuits remain isolated signalwise from each other. At this time the incoming trunk circuit is concurrently connected over the first described path to the digit receiver via a first one of the verticals on the incoming link, and by the second described path to the junctor circuit of this second path via a second vertical on the incoming link. The other side of this junctor circuit is, in turn, connected by the outgoing link to the selected outgoing trunk circuit. As already mentioned, the incoming and outgoing trunk circuits are not at this time interconnected signalwise since the second relay within the junctor circuit for the second established path has not as yet been operated by the processor.

The processor initiates the circuit operations required to connect an outpulser to the outgoing trunk circuit when it determines that sufficient information has been received from the preceding office to permit a determination of the call information that is to be transmitted forward to the next office. The outpulsers are included as among the incoming circuits and each is connected to a unique one of the horizontals of the incoming link. After the processor selects an idle outpulser, it transmits the required information to the marker to operate the incoming link select magnet link associated with the idle outpulser and the outgoing link select magnet associated with the outgoing trunk circuit. In the same manner as before and following the operation of the select magnets, the marker selects an idle junctor for use in establishing this connection, operates the hold magnets on each link unique to the selected junctor, and informs the processor via the scanner that an idle junctor has been found and its hold magnets have been operated. The processor, in turn, via the signal distributor, causes a relay within the junctor to operate and apply a holding ground over its sleeve lead to its hold magnets. The network path between the outpulser and the outgoing trunk circuit is finally completed when the processor operates a relay within the junctor circuit to interconnect the two sets of tip and ring conductors extending to it from the incoming and outgoing links. When the connection between the outpulser and the outgoing trunk circuit is completed, the processor transmits the necessary commands via the signal distributor to the outpulser to cause it to outpulse forward to the next office the information it requires for serving the call.

At this state of the call, it should be emphasized that three separate network connections are concurrently in existence for serving the call. The first is the connection between the incoming trunk circuit and the digit receiver which enables call information to be received from the preceding office. The second connection is that between the incoming trunk circuit and the outgoing trunk circuit. The third connection is between the outpulser and the outgoing trunk circuit. Since the incoming and outgoing trunk circuits have not yet been connected signalwise by the junctor circuit for the second connection, the disclosed system may simultaneously receive information from the preceding office and outpulse information to the next office.

When the processor determines that it has received all the information that is to be outpulsed from the preceding office, it releases the relay in the junctor circuit whose contacts were providing the sleeve lead holding ground for the path to the digit receiver. The release of this relay releases the hold magnets and breaks down the network connection to the receiver. In the same manner, when the outpulsing operation to the next office is completed, the processor, via the signal distributor, releases a relay in the junctor circuit for the third path, to remove the ground from its sleeve lead. The removal of this ground releases the hold magnets of the path and breaks down the network connection between the outpulser and the outgoing trunk circuit. With the release of the connections to the digit receiver and the MF outpulser, the processor now operates the relay in the junctor circuit of the second path to close its make contacts and interconnect signalwise the tip and ring conductors extending to the junctor circuit from each link. This, in turn, interconnects the tip and ring conductors of the incoming and outgoing trunk circuits and thereby permits the calling and called parties to converse when the called station goes off-hook.

The foregoing has illustrated how a system embodying our invention may be operated to enable a single switching network comprising an incoming and outgoing link to establish a plurality of concurrent network connections to circuits having unique network appearances. It may be appreciated that the provision of a single network in an office for the establishment of concurrent connections to the various call serving circuits eliminates the plurality of separate networks heretofore required and thereby greatly reduces the complexity and cost of such switching centers embodying our invention.

A feature of our invention is the provision of a switching system in which a plurality of network connections may be concurrently established to a call serving circuit having a single appearance on the network.

A further feature is the provision of facilities for selectively and independently releasing any of the concurrent network connections extending to the same call serving circuit.

A further feature is the provision of a plurality of junctor circuits interconnecting the incoming and outgoing links of the network with each junctor circuit being effective to maintain and release a network connection extending through it between circuits having unique network appearances.

A further feature is the provision of a relay in each junctor circuit which is effective when operated to apply a holding ground to the sleeve lead of the junctor circuit and to the network hold magnets to which the junctor circuit is connected.

A further feature is the provision of contact closing means within each junctor circuit which are effective when operated for interconnecting the tip and ring conductors extending to the junctor circuit from each link of the switching network.

These and other objects and features of the invention may be more readily understood from a reading of the following description of the invention taken in conjunction with the drawing in which:

FIG. 1 diagrammatically illustrates the principles of a system embodying our invention;

FIGS. 2A, 2B, and 2C when arranged as shown in FIG. 3 illustrate the details of a system embodying our invention.

General Description—FIG. 1

FIG. 1 diagrammatically illustrates the broader aspects of a system embodying our invention. As shown thereon, the system comprises an incoming link 102, an outgoing link 103, and a plurality of junctor circuits 104–0 through 104–99 interconnecting the two links. Connected to the left side of link 102 are a plurality of circuits 105–0 through 105–99. These circuits are shown on FIG. 1 as comprising an outpulser 105–0, an incoming service circuit 105–49, and an incoming trunk circuit 105–99. All of circuits 105–0 through 105–99 may be broadly characterized as incoming circuits since they are connected to the incoming side of the incoming link. Connected to the right side of the outgoing link are a plurality of circuits 110–0 through 110–99. These circuits are shown on FIG. 1 as specifically comprising a digit receiver 110–0, outgoing service circuits 110–49, and outgoing trunk circuit 110–99. All of circuits 110– may be broadly characterized as outgoing circuits since they are connected to the outgoing side of the outgoing link 103. Links 102 and 103, are connected via paths 111 and 112 to a marker 114 which, in a manner analogous to that of prior art markers, selects and closes the network paths required to interconnect a selected incoming circuit with a selected outgoing circuit during the serving of calls.

The remainder of the system on FIG. 1 comprises a stored memory processor 115, a signal distributor 116, and a scanner 117. As is well known in the art, the processor 115 receives signals indicating the state of various circuits and circuit points within the system from the scanner 117 which is connected by means of the conductors comprising cable 130 to the circuits that are to be observed. On FIG. 1, each circuit whose state is monitored by the scanner is shown connected by means of an individual conductor designated S and extending into the scanner cable 130. The number of conductors extending from each circuit to the scanner cable 130 is not specifically shown on FIG. 1 since this will vary in accordance with the number of points within each circuit that are to be monitored.

The output of the scanner is transmitted over cable 118 to the processor 115. The output of the processor is connected via cable 119 to the signal distributor 116 whose output is connected by means of the individual conductors comprising cable 132 to the circuits of the system containing relays that are to be operated or released under control of the processor. Relays that are operated in this manner by the signal distributor are ideally of the magnetic latching type. Each circuit of the system containing one or more relays that are operated by the signal distributor is interconnected with the distributor bus 132 by means of a path designated D. The number of conductors in this path is not specifically shown on FIG. 1 and will be dependent upon the number of relays in each circuit that are to be controlled by the processor.

The processor by means of its memory and by means of the information received from the scanner determines what relay operations within the system are required and, in response thereto, transmits to the signal distributor the necessary command or commands required to effect the operation or release of these relays. The signal distributor responds to the processor commands and, in turn, operates or releases the relays represented or specified by the commands.

The details of the scanner, the processor, the signal distributor, as well as the rest of the electronic circuitry required for the operation of the disclosed system is shown only diagrammatically on FIG. 1 as well as on the remaining figures since the details thereof comprise no portion of the present invention and are furthermore, well known in the art. If desired, they may be of the type shown in the Sept. 1967 issue of the Bell System Technical Journal, which issue is devoted in its entirely to the details of a stored program electronic switching system. If desired, the scanner, processor, and signal distributor shown in this publication may be adapted for use in the system embodying our invention and shown on the present drawing.

A call incoming to the system is recognized when a preceding office 120 seizes one of its outgoing trunk circuits, 121–1 for example, which in turn transmits a forward seizure signal to incoming trunk circuit 105–99. The seizure of the incoming trunk circuit transmits a signal over its path S to the scanner to alter the state of the scanner ferrod unique to the trunk circuit. The change of state information pertaining to the seized incoming trunk circuit is passed by the scanner to the processor which, by means well known in the art, recognizes this change of state as the initiation of a new call. The processor at this time, by means of its memory, identifies the incoming trunk circuit, determines the type of signaling that will be received from office 120 on the call, and determines the sequence of circuit actions required within the office for serving the call. Let it be assumed that the first such circuit action required is the connection of a digit receiver to the incoming trunk circuit in order that the information may be received from office 120. Therefore, the processor now selects an idle receiver of the proper type, such as for example receiver 110–0, and transmits commands to the marker via the signal distributor to cause it to establish the network paths required to interconnect trunk circuit 105–99 with digit receiver 110–0. The instruction supplied to the marker at this time directly specifies the select magnets (not shown on FIG. 1) of the crossbar switches that are to be operated. The marker operates the specified select magnets, searches for and selects an idle junctor interconnecting the trunk circuit and the digit receiver that are to be interconnected, and then closes the hold magnets (not shown on FIG. 1) required for establishing the desired interconnection via the selected junctor circuit.

Let it be assumed that this interconnection is established over junctor circuit 104–0. This interconnection is represented by the dotted line designated "path 1." The marker informs the processor via the scanner when the path to the digit receiver has been established. The processor, in turn, transmits a signal via the signal distributor to junctor circuit 104–0 to operate a relay therewithin which puts a ground on its sleeve lead to maintain operated the hold magnets for path 1.

Subsequent to the establishment of path 1, the processor and the signal distributor apply the necessary control signals to incoming trunk circuit 105–99 to cause it to transmit back to the preceding office an indication that a receiver has been connected to the trunk circuit and that the system of FIG. 1 is ready to receive call information. Receiver 110–0 detects and passes to the processor, via the scanner, each digit received from office 120. When the processor has received a sufficient number of digits to enable it to determine the office to which the call is to be routed; it selects an idle outgoing trunk circuit extending to that office such as, for example, outgoing trunk circuit 110–99 which is connected by trunk 113 to incoming trunk circuit 123–1 of office 122. When trunk circuit 110–99 is selected, the processor instructs the marker to establish the network paths required to interconnect incoming trunk circuit 105–99 and outgoing trunk circuit 110–99. The marker establishes the network paths in the same manner as already described. Let it be assumed that this interconnection is established via junctor circuit 104– 99 and is represented by the dotted lines within each link designated "path 2." The marker, in the same manner as before, informs the processor when this path has been established; the processor then instructs the signal distributor to operate a relay within junctor circuit 104–99 to apply a holding ground to its sleeve lead in order to maintain operated the hold magnets of the path. The two sets of tip and ring conductors of this junctor circuit, i.e., paths 107–99 and 108–99, are not interconnected at this time within the junctor circuit in order to maintain separated for the time being the tip and ring conductors of trunk circuit 105–99 from those of trunk circuit 110–99. The reason for this is subsequently explained.

Subsequent to the establishment of network path 2 between incoming trunk circuit 105–99 and outgoing trunk circuit 110–99, the processor analyses the status of the call, determines that an outpulser should now be connected to outgoing trunk circuit 110–99 in order that call information may be transmitted forward to office 122. Having made this determination, the processor selects an idle outpulser, such as for example outpulser 105–0, and instructs the marker to establish a network path between the outpulser and the outgoing trunk circuit. These two circuits are interconnected by the network under control of the marker in a manner similar to that already described. Let it be assumed that this interconnection is established via junctor circuit 104–49. This interconnection is represented by dotted lines designated "path 3." Subsequent to the establishment of path 3, the processor instructs the signal distributor to operate the sleeve lead grounding relay within junctor 104–49. The processor also causes a relay within the junctor circuit to operate to interconnect the tip and ring conductors for each of paths 107–49 and 108–49. This completes the connection between the outpulser and the outgoing trunk circuit.

At this stage of the call, it may be seen that the incoming trunk circuit 105–99 is connected to receiver 110–0 via path 1, which includes junctor 104–0, in order that the information outpulsed from the office 120 may be received and passed to the processor. Trunk circuit 105–99 is also currently connected via path 2 and junctor circuit 104–99 to outgoing trunk circuit 110–99. Outgoing trunk circuit 110–99, is also connected via path 3 and junctor circuit 104–49 to outpulser 105–0. The tip and ring path within junctor circuit 104–99 is open at this time while the tip and ring path within junctor circuits 104–0 and 104–49 are closed. By means of these connections, each digit received from the preceding office is passed from receiver 110–0 via the scanner to the processor which, in turn, analyses the digits, determine the digits that are to be outpulsed to the next office, and by means of the signal distributor causes the digits required by office 122 to be transmitted thereto by means of outpulser 105–0, path 3 and junctor 104–49 to outgoing trunk circuit 110–99 extending to office 122.

When the processor determines that all of the call information has been received from the prior office, it instructs the signal distributor to release the relay within junctor circuit 104–0 that applies the holding ground to its sleeve lead. The release of this relay removes the ground from the sleeve lead and releases the hold magnets associated with path 1. This breaks down the interconnection between the incoming trunk circuit and receiver 110–0. In the same manner, when the outpulsing operation is terminated, the sleeve lead holding relay within junctor circuit 104–49 is released, the hold magnets of path 3 are released to break down the connection between outpulser 105–0 and outgoing trunk circuit 110–99. At this time, the processor instructs the signal distributor to operate a relay within junctor circuit 104–99 to interconnect the tip and ring conductors of paths 107–99 and 108–99 and thereby complete a transmission path between incoming trunk circuit 105–99 and outgoing trunk circuit 110–99 so that the calling and called parties may converse when the connection to the called station office is finally established.

DETAILED DESCRIPTION—FIGS. 2A, 2B, 2C, and 3

Figures 1, 3:
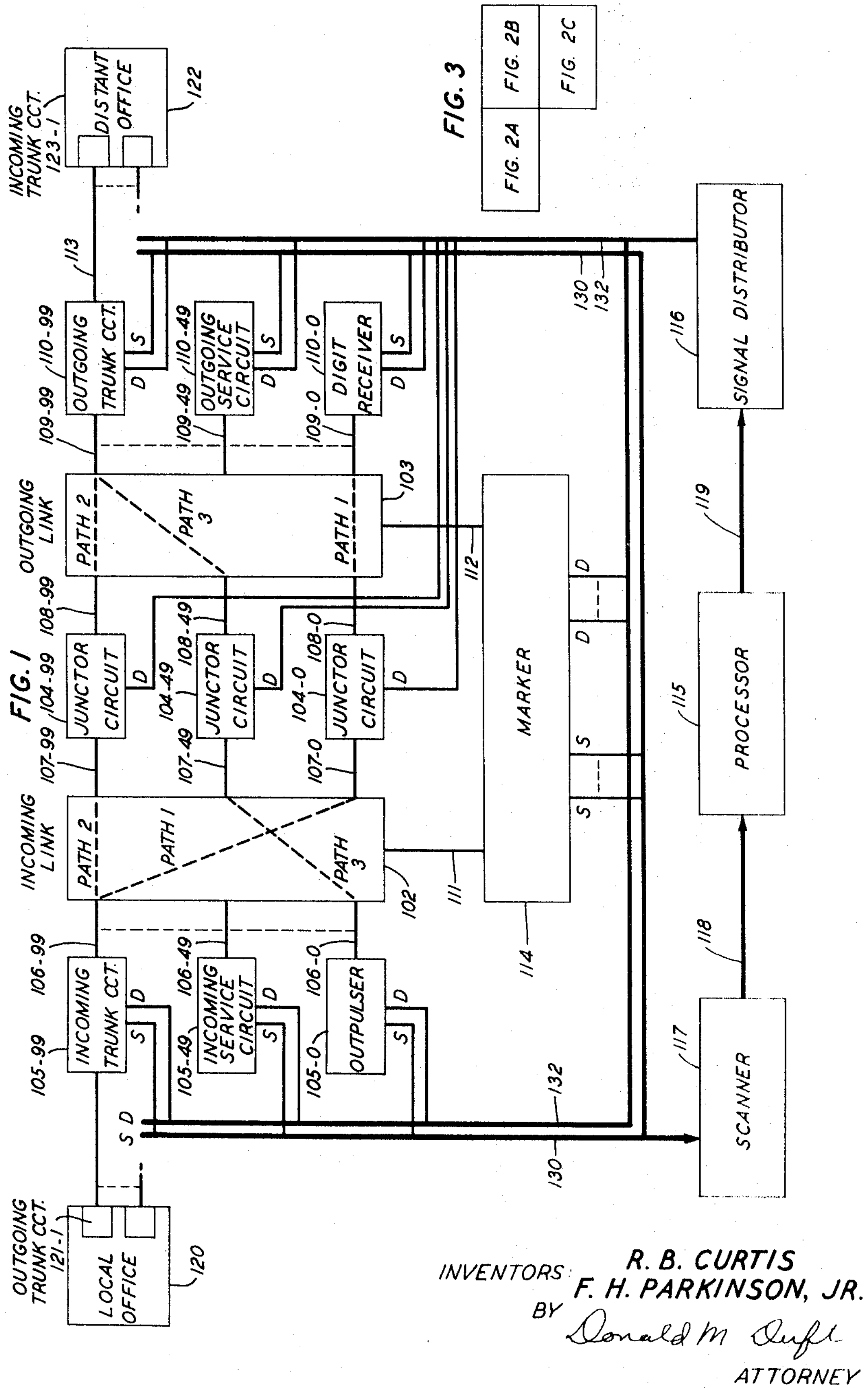
Figure 2A:
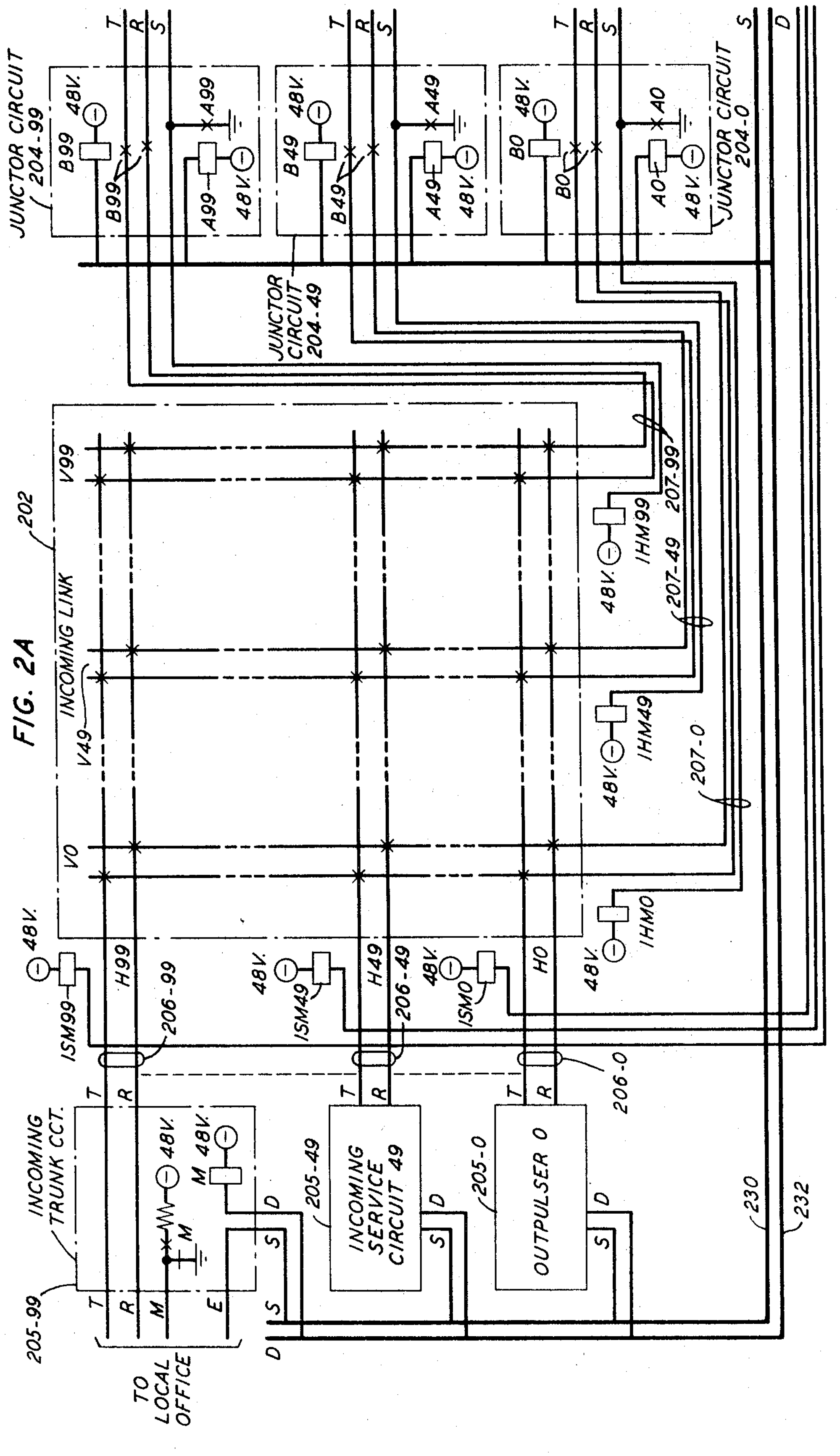
Figure 2B:
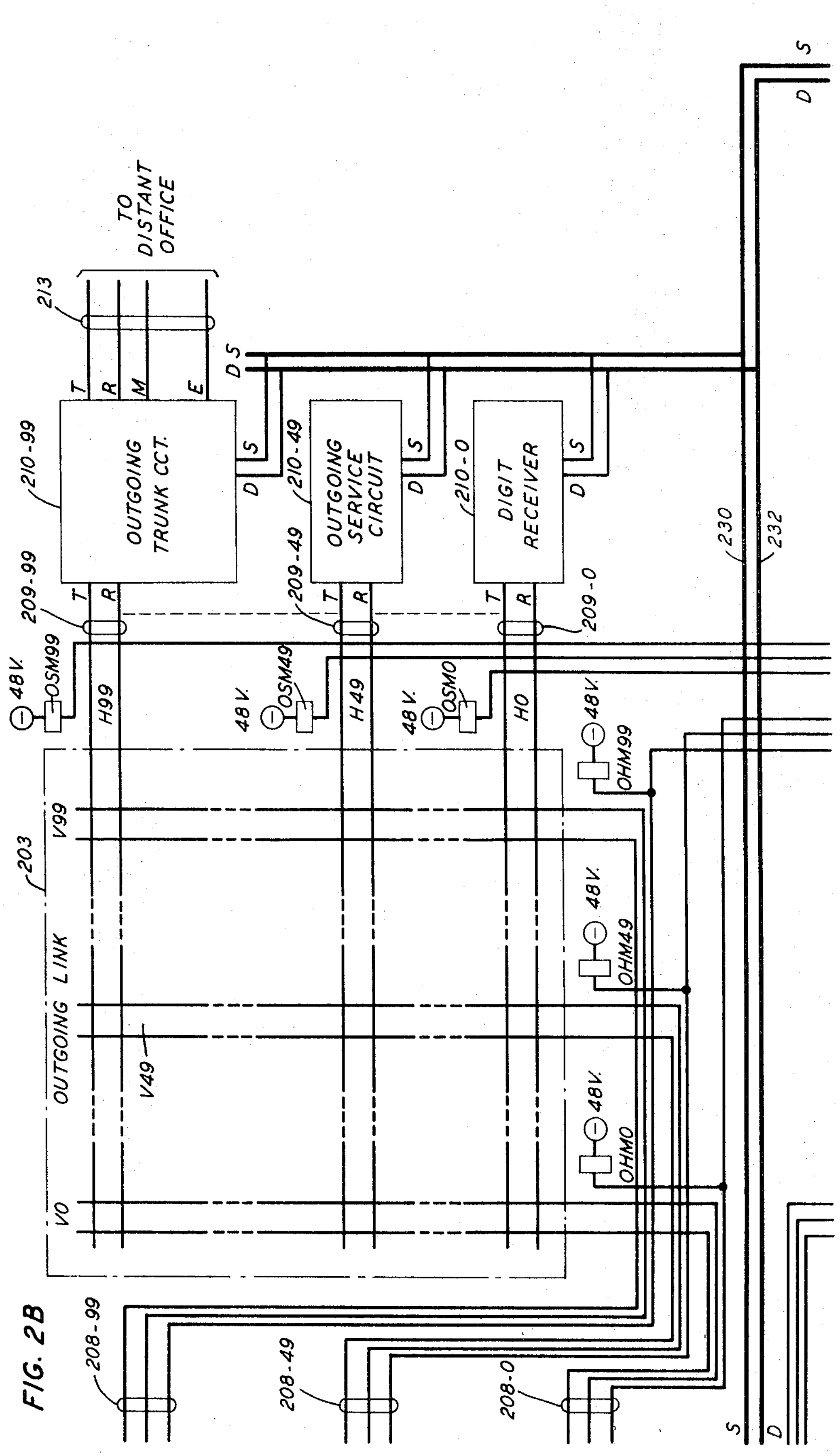
Figure 2C:
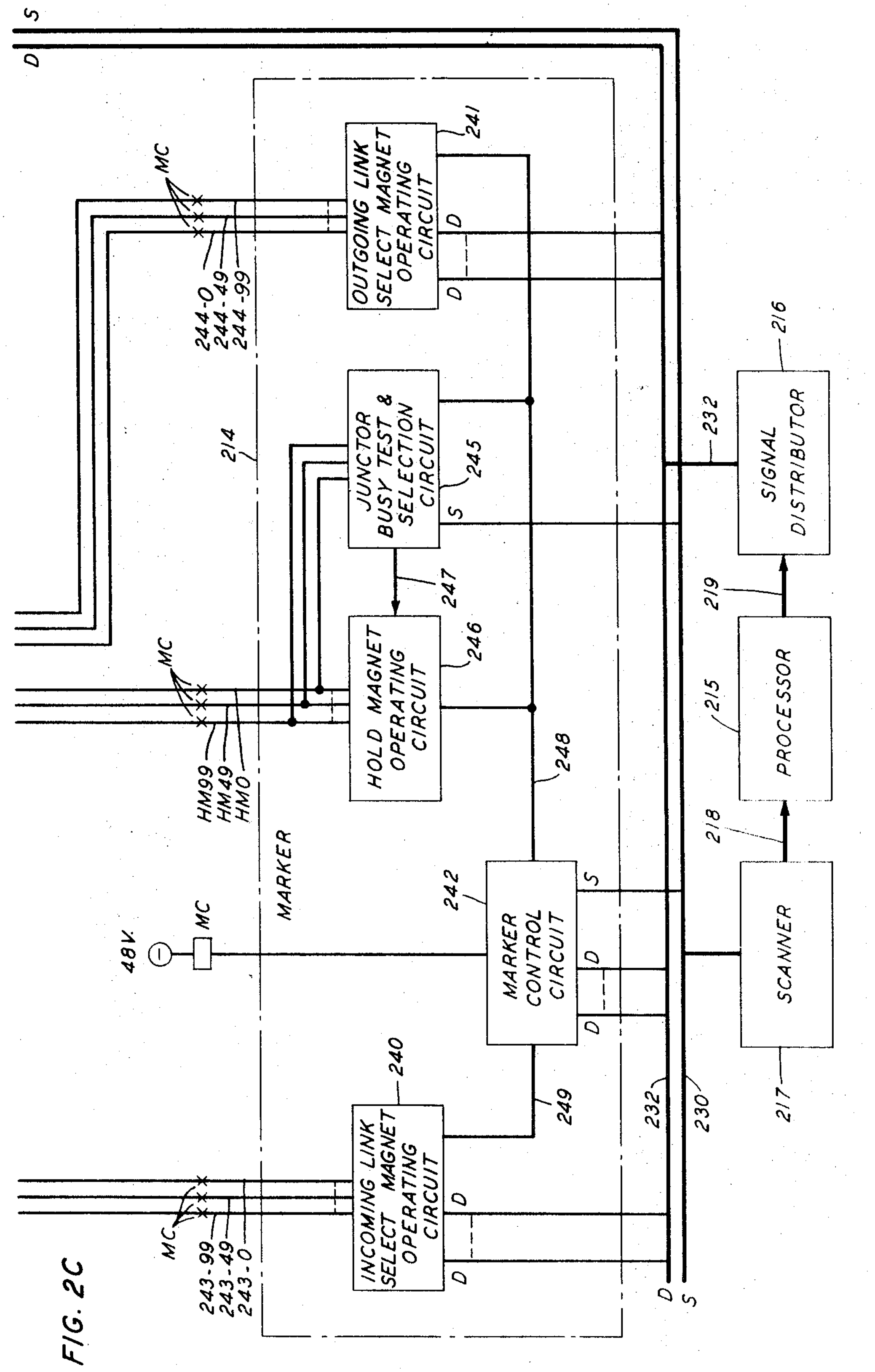

The system shown diagrammatically on FIG. 1 is shown in detail on FIGS. 2A, 2B, and 2C when arranged with respect to each other as shown on FIG. 3. The system elements shown on FIGS. 2A, 2B, and 2C which correspond to those shown on FIG. 1 are numbered in a manner to facilitate an appreciation of the correspondence. Specifically, the last two digits of the designation (excluding suffixes) of each element on FIGS. 2A, 2B, and 2C is identical to that of the last two digits of its corresponding element on FIG. 1. Thus, the scanner is designated as element 117 on FIG. 1 and as element 217 on FIG. 2C. Similarly, the upper left incoming trunk circuit on FIG. 1 is designated 105–99 and on FIG. 2A is designated 205–99.

Both the incoming and outgoing links, are shown as comprising 100 by 100 type crossbar switches, i.e., each has 100 horizontals or levels and 100 verticals or columns. Each horizontal on the incoming link 202 is connected to a unique incoming trunk circuit, incoming service circuit, or an outpulser. Each horizontal on the outgoing link 203 is connected to a unique outgoing trunk circuit, service circuit, or digit receiver. The corresponding verticals of the two networks are interconnected with each other by means of individual junctor circuits. Thus, the leftmost vertical, VO, of the incoming link is connected via junctor circuit 204–0 to the leftmost vertical, VO, of the outgoing link. The other corresponding verticals of the two links are similarly interconnected by the remaining junctor circuits.

Each select magnet is shown adjacent the conductors of the horizontal with which it is associated. The select magnets for the incoming link are designated ISMO through ISM99 while the select magnets for the outgoing link are designated OSMO through OSM99. Each hold magnet is shown adjacent the conductors of the switch vertical with which it is associated. The hold magnets for the incoming link are designated IHMO through IHM99; the hold magnets for the outgoing link are designated OHMO through OHM99. The select magnet windings are connected by means of contacts of a marker connector relay (MC) to marker 214. The hold magnets are connected to the sleeve lead of the junctor circuits with the hold magnets of the corresponding verticals on each network being connected to the same junctor circuit. Thus, hold magnet IHMO for vertical 0 on the incoming link is connected to the sleeve S lead of junctor 204–0, as is hold magnet OHMO which is associated with the vertical O of the outgoing link.

Each junctor circuit contains an A and a B relay. The make contacts of the A relay apply a holding ground to the S lead of the junctor circuit and, in turn, to its associated hold magnets when the relay is operated. The make contacts of the B relay interconnect the two sets of the tip and ring conductors of the junctor circuit when the relay is operated. Thus, with reference to junctor circuit 204–0, the operation of relay AO applies a holding ground to sleeve lead of paths 207–0 and 208–0, while the operation of relay BO closes its make contacts to interconnect the tip and ring conductors of these same two paths. Conductors HMO through HM99 extend from the marker circuit, via make contacts of the MC relay to the sleeve lead of the junctor circuits for reasons that are subsequently described.

The marker is shown in greater detail than on FIG. 1 and the various circuits shown within the marker are subsequently described in connection with the serving of a hypothetical call. The electronic circuitry that is required for the operation of this system is shown in the same manner as on FIG. 1 since equipment for performing this function is well known in the art and its details comprise no part of our invention.

In order to illustrate further the details of the system shown on FIGS. 2A, 2B, and 2C, let it be assumed that a call is received on incoming trunk circuit 205–99. The seizure of this trunk circuit by the preceding office is manifested by a potential on the E lead of the trunk circuit. This potential is passed from the E lead of the trunk circuit to its S lead and transmitted to the scanner and, in turn, to the processor. In response to receipt of this signal, the processor identifies the incoming trunk circuit, ascertains that this seizure represents a newly arrived call, and determines the sequence of connections required within the office for serving the call. The first such interconnection required, for example, may be the interconnection of the incoming trunk circuit with a digit receiver in the same manner as described for FIG. 1. This being the case, the processor at this time selects an idle receiver such as for example, receiver 210–0 and instructs the marker to establish a network path between the calling trunk circuit and the selected receiver.

The instructions to the marker at this time directly specify the select magnets that are to be operated. Thus, the Incoming Link Select Magnet Operation Circuit 240 of the marker receives from the signal distributor information specifying that select magnet ISM99 is to be operated; the Outgoing Select Magnet Operating Circuit 241 receives information specifying that the select magnet OSMO on the outgoing link is to be operated. The signal distributor also operates relays within the Marker Control Circuit 242 to cause it to initiate the rest of the circuit operations required within the marker to complete a network path between incoming trunk circuit 205–99 and digit receiver 210–0. Immediately following the receipt of this information from the signal distributor, the Marker Control Circuit 242 causes relay MC to operate and close its make contacts shown on FIG. 2C. At this time, and in response to the information received, the Incoming Select Magnet Operating Circuit 240 operates select magnet ISM99 over conductor 243–99. At the same time, the Outgoing Select Magnet Operating Circuit 241 operates select magnet OSMO over conductor 244–0. Following the operation of the select magnets, of the Junctor Busy Test and Selection Circuit 245 determines which of junctor circuits 204–0 through 204–99 are currently idle and selects one of the idle junctors for use on this connection. In the same manner as the prior art markers, circuit 245 looks for grounds on conductors HMO through HM99 in order to determine which junctor circuits are idle. The ones of these conductors that are grounded are associated with currently busy junctor circuits; the ones of these conductors that are not currently grounded are associated with idle junctor circuits. The results of the junctor selection are communicated over path 247 to the Hold Magnet Operation Circuit 246 which, in response thereto, applies a potential to the appropriate one of conductors HMO through HM99 to operate the hold magnets associated with the selected junctor circuit.

Let it be assumed that junctor circuit 204–0 is idle and is selected for use on this interconnection. This being the case, the Hold Magnet Operation Circuit 246 applies a potential over conductor HMO to operate hold magnets OHMO on the outgoing link and IHMO on the incoming link. Since select magnets ISM99 and OSMO have been priorly operated, the operation of these hold magnets complete network paths required for the interconnection of incoming trunk circuit 205–99 with digit receiver 210–0. Immediately subsequent to the operation of the hold magnets, the Marker Control Circuit 242 transmits signals back to the scanner over bus 230 and, in turn, to the processor informing it that junctor circuit 204–0 has been selected to serve the call and that its associated hold magnets have been operated. In response to the receipt of this information, the processor causes the signal distributor to operate relays AO and BO within junctor circuit 204–0. The operation of relay AO closes its make contacts to ground the sleeve lead of the junctor circuit. This provides a path to maintain the hold magnets IHMO and OHMO operated when the marker releases the MC relay and the select magnets following the completion of its functions in connection with the establishment of this path. Relay BO operates and closes its contacts to interconnect the T and R conductors of paths 207–0 and 208–0.

Subsequent to the connection of the receiver 210–0 to incoming trunk circuit 205–99, the processor via the signal distributor, applies potentials to the signal distributor point D of the trunk circuit to operate its M relay and thereby transmit a signal backwards over its M lead to the originating office indicating that a receiver has been attached to the trunk circuit and that outpulsing from the originating office may now begin. Each digit of call information received, detected by the receiver and passed by the scanner to the processor. When a sufficient number of digits have been received (normally 3 or 6) to enable the processor to determine the forward office that is to be used in serving the call, the processor selects an idle outgoing trunk circuit in the trunk group extending to the selected forward office. Let it be assumed that outgoing trunk circuit 210–99 is in this trunk group, that it is idle, and that it is selected by the processor. This being the case, the processor proceeds in a manner similar to that already described to command the marker to establish the network paths required to interconnecting incoming trunk circuit 205–99 with outgoing trunk circuit 210–99. In so doing, the processor instructs the marker to operate select magnets on ISM99 on the incoming link and OSM99 on the outgoing link. Following this, the marker, as before, (1) hunts for an idle junctor circuit; (2) selects an idle junctor from those that are currently idle; (3) operates the hold magnets for the selected junctor circuit; and (4) informs the processor which junctor circuit was selected and that its hold magnets have been closed.

Let it be assumed that junctor circuit 204–99 is selected and therefore that hold magnets IHM99 and OHM99 are operated by the marker. The processor, when it is informed by the marker via the scanner that the junctor circuit 204–99 has been selected and its hold magnets operated, transmits a signal via the signal distributor to operate relay A99 which closes its make contacts to ground the sleeve lead of the junctor circuit. This provides a holding ground for hold magnets IHM99 and OHM99 when the marker subsequently releases its MC relay and the select magnets. Relay B99 of the junctor circuit is not operated at this time since it is desired to maintain the tip and ring conductors of incoming trunk circuit 205–99 disconnected from the outgoing trunk circuit 210–99 for the time being.

When the processor receives a sufficient number of digits from the preceding office to enable it to determine the digits that must be outpulsed to the next office, it selects an idle outpulser and, in the same manner as before, causes the marker to establish a network path between the selected idle outpulser and outgoing trunk circuit 210–99. Let it be assumed that outpulser 205–0 is selected. This being the case, the processor instructs the marker to operate select magnets ISMO on the incoming link and OSM99 on the outgoing link. The marker then selects an idle junctor circuit and operates the hold magnets of the selected junctor circuit. Let it be assumed that junctor circuit 204–49 is idle and is selected by the marker for establishing the connection between the outpulser and the outgoing trunk circuit. The marker advises the processor when the connection has been completed and the processor then operates relays A49 and B49 of the junctor circuit. Relay A49 grounds the sleeve lead to maintain the established connection; the operation of relay B49 closes its make contacts to interconnect the tip and ring conductors of paths 207–49 and 208–49.

Subsequent to the connection of the outpulser, the processor, by means of the signal distributor, transmits signals to the outpulser to cause the call information required by the next office to be outpulsed thereto via the incoming link, junctor circuit 204–49, the outgoing link, and outgoing trunk circuit 210–99.

The calling incoming trunk circuit has priorly been connected via the incoming link to junctor circuit 204–99 which, in turn, is connected by means of the outgoing link to outgoing trunk circuit 210–99. The tip and ring conductors for this path however currently remains open by virtue of the unoperated state of relay B99 in the junctor circuit. This path has been held open to isolate the calling incoming tip and ring conductors from trunk circuit 210–99. This expedient permits the receiver to be connected to incoming trunk circuit for the reception of the digits outpulsed from the preceding office and the outpulser 205–0 to be connected concurrently to outgoing trunk circuit 210–99 for the outpulsing of information to the next office. Since the calling incoming tip and ring conductors are temporarily isolated from the outgoing tip and ring conductors, there is no interference between the signals concurrently being received and outpulsed by the office; therefore, the serving of the call is expedited by permitting two call serving functions in the office to be taking place concurrently via a single-switching network.

The processor causes the connection to the receiver to be released after it determines that all the information has been received that is to be outpulsed from the preceding office. The release of this connection is effected by transmitting a command to the signal distributor which, in turn, releases relay AO in junctor circuit 204–0. The release of this relay opens the sleeve lead holding ground for hold magnets IHMO and OHMO. The release of these hold magnets breaks down the network connection between incoming trunk circuit 205–99 and digit receiver 210–0.

In a similar manner, when the forward outpulsing operation has been concluded, the processor effects the release of the network path to the outpulser. The release of this path is accomplished by the transmission of a command to the signal distributor which causes it to release relay A49 in junctor circuit 204–49 and remove the sleeve lead holding ground from hold magnets IHM49 and OHM49. Finally, when the connection to the outpulser and the digit receiver are released, the processor causes the signal distributor to operate relay B99 which closes its make contacts and effectively interconnects the tip and ring conductors of incoming trunk circuit 205–99 with outgoing trunk circuit 210–99.

The incoming service circuit 205–49 and the outgoing service circuit 210–49 have been designated in this manner since the specific nature of these circuits and the functions performed thereby is immaterial to an understanding of the present invention. The specific function of each of these circuits will be determined wholly by each commercial applications of the system shown on FIGS. 1 and 2. For example, the incoming service circuit could comprise additional outpulsers, additional incoming trunk circuits, information trunk circuits, operator position circuits, et cetera depending upon commercial requirements. In the same manner, the outgoing service circuit may be of any type desired in accordance with the requirements of the system in which the invention is embodied. For example, the outgoing service circuit could comprise operator positions of the type disclosed in the aforementioned Curtis patent in which person-to-person type calls are temporarily connected to an operator position for the furnishing of the operator assistance required above and beyond the extension of a connection to the called station. In this case, the outgoing service circuit would be connected via the network and an idle junctor circuit to the calling trunk circuit after the processor determines that the call is of the person-to-person type. This determination could be made from an analysis of the call information outpulsed from the preceding office and received by the digit receiver of this office. Then, after the processor has caused the digit receiver to be released from the incoming trunk circuit, it would command the marker, in the manner already described, to establish a network connection between the calling incoming trunk circuit and an idle operator position circuit. In the manner disclosed in Curtis, the operator would remain connected only for the time required for her to furnish the required person-to-person service. Following this, she would be released from the call and the remainder of the call would be served in the same manner as already described. It would be immaterial whether the operator position is connected to the incoming trunk circuit before or after the outpulsing operation to the next office occurs. This would be dependent upon the operational requirements of the office rather than by any physical limitations of the equipment provided in accordance with the invention.

In summary of the foregoing, it should be appreciated that our invention permits, during the serving of a single call, a network comprising an incoming and outgoing link to establish and maintain a plurality of connections concurrently to one or more circuits each of which has only a single network appearance. The use of a single switching network to establish connections in this manner greatly reduces the expense and complexity of the switching equipment required within the office by eliminating the plurality of switching networks that were heretofore required in offices in which concurrent connections must be established and maintained from a calling incoming trunk circuit to various other circuits of the office.

It is to be understood that the above-described arrangements are but illustrative of the application of the principles of the invention. Numerous other arrangements may be devised by those skilled in the art without departing from the spirit and scope of the invention. For example, the incoming and outgoing links have been shown to comprise a 100 by 100 point crossbar type switch in order to simplify an understanding of the invention. In accordance with well-known network practices, a larger installation would use a plural stage network for each link in order to provide for maximum link efficiency when such factors as blocking, load, et cetera are considered. Further, our system has been shown to have only a single marker, but it is to be understood that a plurality of markers, in accordance with conventional practice, could be employed in order to increase the call handling capabilities of the office and to provide for the continuance of satisfactory call service in the event that one marker should become inoperative. The select magnet operating circuits have been shown as a portion of the marker in the present specification. This is not a necessity; if desired, the select magnets could be operated directly from the distributor inasmuch as it is the processor that specifies to the marker which select magnets should be operated. This being the case, the circuitry involved in the operation of the select magnets could be connected directly to signal distributor points and thereby be under direct control of the processor rather than via the intermediary of a marker. Also, in the simplified type network shown on the present drawing, the selection of an idle junctor and the operation of the hold magnets associated therewith could be also under the direct control of the processor via the signal distributor. However, in a system embodying our invention wherein each link would comprise a plurality of switching stages, the number of junctors that would have to be tested in examining the paths available to set up each connection would become of such size and complexity that undue processor time would be involved in performing this function. Therefore, a marker appears preferable to control the network in such an arrangement in order to reduce real time processor requirements.

We claim:

1. In a communication-switching system, a first and a second switching network, a first group of circuits each of which is connected to an individual appearance on said first network, a second group of circuits each of which is connected to an individual appearance on said second network, scanner means connected to each of said circuits for monitoring the supervisory state thereof, a plurality of circuit paths interconnecting said first and said second networks, means including said scanner means responsive to the receipt of a call by any circuit in said first group for controlling the establishment of a first network interconnection over any one of said paths between said call-receiving circuit in said first group and a selected circuit in said second group, a junctor circuit in each of said paths, and means in the junctor circuit of said one path for maintaining said network interconnection under control of said scanner means.

2. The system of claim 1 in combination with signal conductors in each of said paths for enabling the transmission of signals between the circuits interconnected by said networks, a control conductor in each of said paths, and control means including said maintaining means in the junctor circuit of said one path for applying a potential to its control conductor to maintain said network connection.

3. The system of claim 2 in which said control means comprises, a control relay in the junctor circuit of said one path, and contacts on said control relay for applying a holding potential to said control conductor whenever said relay is in an operated state.

4. The system of claim 3 in combination with, a signal relay in each of said junctor circuits, and contacts on each of said signal relays for disconnecting from each other the signal conductors extending to its junctor circuit from each of said networks whenever said signal relay is in a released state and for interconnecting the corresponding signal conductors extending to its junctor circuit whenever said signal relay is in an operated state.

5. The system of claim 1 in combination with means additionally responsive to the receipt of said call by said circuit in said first group for maintaining said first network interconnection and for concurrently establishing a second network interconnection between said call receiving circuit in said first group and another circuit in said second group, and means further responsive to the serving of said call for maintaining said first and second network interconnections and for concurrently establishing a third network interconnection between said selected circuit in said second group and another circuit in said first group.

6. The system of claim 5 in combination with means for releasing any one of said concurrent interconnections independently while maintaining the remainder of said interconnections.

7. In a communication-switching system, a first and a second switching network, a first group of circuits each of which is connected to an individual appearance on said first network, a second group of circuits each of which is connected to an individual appearance on said second network, scanner means connected to each of said circuits for monitoring the supervisory state thereof, a plurality of circuit paths interconnecting said first and said second networks, a junctor circuit in each of said paths, means including said scanner means responsive to the receipt of a call by any circuit of said first group for concurrently controlling the establishment of a plurality of network connections over selected ones of said paths from said circuit receiving said call in said first group to a plurality of selected circuits in said second group, and means in the junctor circuit of each one of said selected paths for maintaining each network connection established thereover independently of the maintenance of the other established connection to the same call receiving circuit.

8. The system of claim 7 in combination with a path control conductor in each of said paths, and control means including said maintaining means in each of said junctor circuits over which a connection is established for applying a potential to its path control conductor to maintain the interconnection established over its path.

9. The system of claim 8 in which said control means comprises, a control relay in each of said junctor circuits, and contacts on each of said control relays for applying a holding potential to its control conductor whenever said relay is in an operated state.

10. In a communication switching system, a first and a second matrix type switching network, each of said networks comprising at least one matrix switch having conductors arranged into a plurality of horizontal rows and a plurality of vertical columns, contacts at the intersection of each row and column for selectively interconnecting the conductors common thereto, a first group of circuits each of which is connected to an individual horizontal on said first network, a second group of circuits each of which is connected to an individual horizontal on said second network, a plurality of circuit paths each of which interconnects a switch vertical in said first network with a switch vertical in said second network, means responsive to the serving of a call by said system for establishing a first network interconnection over one of said paths between a selected circuit in each of said first and second groups, means additionally responsive to the serving of a call by said system for maintaining said first network interconnection and for concurrently establishing a second network interconnection between said selected circuit in said first group and another circuit in said second group, and means further responsive to the serving of a call by said system for maintaining said first and second interconnections and for establishing a third network interconnection between said selected circuit in said second group and another circuit in said first group, and means for independently releasing any one of said concurrent connections while maintaining the remainder of said connections.

11. The invention of claim 10 wherein said maintaining means comprises a junctor circuit in each of said paths for maintaining each network interconnection established thereover.

12. In a communication switching system, a first and a second switching network, a plurality of circuit paths interconnecting said networks, a plurality of incoming trunk circuits each of which is connected to an individual appearance on said first network, a plurality of receivers each of which is connected to an individual appearance on said second network, means responsive to the reception of a call by one of said incoming trunk circuits for establishing a network connection over a first one of said paths from said calling trunk circuit to one of said receivers, a plurality of outgoing trunk circuits each of which is connected to an individual appearance on said second network, means additionally responsive to the reception of said call for maintaining said connection to said receiver and for establishing over a second one of said paths the network connections required to interconnect said calling trunk circuit with a selected one of said outgoing trunk circuits, a plurality of outpulsers each of which is connected to an individual appearance on said first network, means additionally responsive to the reception of said call for establishing a network connection over a third one of said paths between one of said outpulsers and said selected outgoing trunk circuits, means for subsequently releasing said network connection to said receiver and to said outpulsers, and means subsequently effective for completing said interconnection between said incoming and outgoing trunk circuits.

13. The system of claim 12 in which each of said paths comprises a junctor circuit, and means in each of said junctor circuits for maintaining each network connection established thereover.

14. The system of claim 13 wherein each path further comprises a control conductor, and wherein said means in each of said junctor circuits for maintaining comprises means in each of said junctor circuits for applying a holding potential to the control conductor of its path subsequent to the establishment of a network connection thereover.

15. The system of claim 14 wherein each of said paths further includes signal conductors and wherein said junctor circuits include means for interconnecting the signal conductors extending to each of said junctor circuits from each of said networks subsequent to the establishment of a network connection thereover.

16. In a communication-switching system, a first and second matrix type switching network, each of said networks comprising at least one matrix switch, a plurality of circuit paths interconnecting said networks, conductors on each of said switches arranged into a plurality of horizontal rows and a plurality of vertical columns, contacts at the intersection of each row and column for selectively connecting the conductors thereto, a select magnet individual to each of said rows and a hold magnet individual to each of said columns, a first group of circuits each of which is connected to an individual row of said first network, a second group of circuits each of which is connected to an individual row of said second network, and means responsive to the reception of a call by said system for establishing a plurality of concurrent network connections to a circuit in each of said groups.

17. The system of claim 16 in which said establishing means comprises a system controller, a marker, and means responsive to the reception of a call for transmitting information from said controller to said marker specifying the select magnets that are to be operated for said interconnections, means in said marker effective upon the operation of the select magnets for each interconnection for selecting the path that is to be used on said interconnection, and means responsive to said selection for operating the hold magnets required to complete said interconnection via said selected path.

18. The system of claim 17 wherein each of said paths comprises, a junctor circuit, a means responsive to each operation of said hold magnets by said marker for transmitting information to said controller specifying the path and the junctor circuit that has been selected for use on an interconnection, and means in each of said junctor circuits operable under control of said controller for maintaining the hold magnets of its path operated.

19. The system of claim 18 in which each junctor circuit comprises, a relay operable under control of said controller for interconnecting the path conductors extending to said junctor circuit from each of said networks.

20. The system of claim 19 in combination with means in each of said junctor circuits controlled by said controller for independently releasing the hold magnets of an interconnection established over said junctor circuit from a circuit in one of said groups while any other concurrent network connections to said circuit are maintained.